US012727588B2

(12) United States Patent
Kawasaki et al.

(10) Patent No.: US 12,727,588 B2
(45) Date of Patent: Sep. 8, 2026

(54) LURE

(71) Applicant: Shimano Inc., Osaka (JP)

(72) Inventors: Tatsuro Kawasaki, Osaka (JP); Shin Yamada, Osaka (JP); Tadasuke Nakamichi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/507,125

(22) Filed: Oct. 21, 2021

(65) Prior Publication Data

US 2022/0039363 A1 Feb. 10, 2022

Related U.S. Application Data

(63) Continuation of application No. 16/354,776, filed on Mar. 15, 2019.

(30) Foreign Application Priority Data

Apr. 19, 2018 (JP) ................................ 2018-080504

(51) Int. Cl.
*A01K 85/01* (2006.01)
*A01K 85/16* (2006.01)

(52) U.S. Cl.
CPC ............. *A01K 85/01* (2013.01); *A01K 85/16* (2013.01)

(58) Field of Classification Search
CPC ........ A01K 85/01; A01K 85/16; A01K 85/12; A01K 85/00; A01K 85/012
See application file for complete search history.

(56) References Cited

U.S. PATENT DOCUMENTS 2,585,783 A 2/1952 Johnston
2,737,750 A 3/1956 Pierce
2,833,078 A * 5/1958 Peltz ..................... A01K 85/01 43/42.31
2,871,608 A 2/1959 Fisher
3,085,361 A * 4/1963 Rhodes ................. A01K 85/01 43/26.2
3,762,092 A 10/1973 Bercz et al.
4,380,132 A 4/1983 Atkinson
4,959,919 A 10/1990 Rao et al.
6,029,388 A 2/2000 Yokogawa et al.
6,158,161 A 12/2000 Rossman
(Continued)

FOREIGN PATENT DOCUMENTS

JP 10-191839 A 7/1998
JP 10-215730 A 8/1998
(Continued)

OTHER PUBLICATIONS

Shimano, Southeast Asia & South Asia 2017/2018 Fishing Tackle Catalogue; 2017, p. 1, 2 and 98-109, Japan.

*Primary Examiner* — Carly W. Lynch
(74) *Attorney, Agent, or Firm* — Spencer Fane, LLP

(57) ABSTRACT

A lure basically includes a body containing a cavity, a swinging part and a rod. The body is configured to move in a reeling direction. The swinging part is movably mounted in the body so as to be movable in the cavity after the body changes from a moving state to a stopped state. The rod extends inside the cavity in a thickness direction of the body with respect to the reeling direction. The rod has a pair of opposite ends. Each end of the rod is fixed to the body. The rod penetrates the swinging part.

9 Claims, 6 Drawing Sheets

(56) References Cited

U.S. PATENT DOCUMENTS

| | | | | |
|---|---|---|---|---|
| 6,647,659 | B1 | 11/2003 | King et al. | |
| 7,520,085 | B2 | 4/2009 | Edwards et al. | |
| 8,667,728 | B2 | 3/2014 | Ware | |
| 2005/0034349 | A1 | 2/2005 | Dugger, II | |
| 2008/0000141 | A1 | 1/2008 | Hair et al. | |
| 2011/0010984 | A1 | 1/2011 | Reynolds | |
| 2014/0190065 | A1 * | 7/2014 | Ulianov | A01K 85/12<br>43/42.19 |
| 2016/0000057 | A1 * | 1/2016 | Mistilis | A01K 85/01<br>43/42.12 |
| 2016/0309687 | A1 | 10/2016 | Ito | |

FOREIGN PATENT DOCUMENTS

| | | | | | |
|---|---|---|---|---|---|
| JP | 2002-34391 | A | | 2/2002 | |
| JP | 2002330668 | A | * | 11/2002 | A01K 85/00 |
| JP | 2003219765 | A | * | 8/2003 | A01K 85/01 |
| JP | 2003289759 | A | * | 10/2003 | A01K 85/00 |
| JP | 2006-197827 | A | | 8/2006 | |
| JP | 2011055710 | A | * | 3/2011 | A01K 85/16 |
| KR | 20140094045 | A | * | 7/2014 | A01K 85/01 |
| WO | WO-2004014132 | A1 | * | 2/2004 | H02N 2/18 |

* cited by examiner

LURE

CROSS-REFERENCE TO RELATED APPLICATIONS

This application is a continuation application of U.S. application Ser. No. 16/354,776, filed on Mar. 15, 2019. The entire disclosure of U.S. application Ser. No. 16/354,776 is hereby incorporated herein by reference. This application claims priority to Japanese Patent Application No. 2018-080504, filed on Apr. 19, 2018. The entire disclosure of Japanese Patent Application No. 2018-080504 is hereby incorporated herein by reference.

BACKGROUND

Technical Field

The present invention generally relates to a lure that is used for fishing.

Background Information

Large fish such as largemouth bass, yellowtail, and sea bass prey on small fish. These large fish are called fish eaters. Lure fishing is a popular method of catching fish eaters. In lure fishing, lures resembling bait, such as small fish, are used. The lure is cast and flies through the air, and eventually lands in the water. The lure is made to swim through the water by winding the line. A fish eater mistaking the lure for bait will bite the lure. A hook attached to the lure becomes embedded the fish eater, and the fish eater is reeled in. The frequency with which fish eaters bite the lure is called the hit rate.

Various ideas for lures have been proposed to increase the hit rate. For example, glossy paint can be applied to the lure. When such a lure moves, the state of reflection of light changes, which attracts fish eaters. In another lure, a rattle ball is provided in a space inside the body of the lure. As the lure moves, the ball rolls and produces sound which attracts fish eaters. Lures that oscillate as they swim when pulled are also known. Various lures are disclosed in "2017 Shimano Fishing Tackle Catalog" issued by Shimano, Inc.

SUMMARY

In lure fishing, after the lure is cast, the angler repeats the action of pulling the line and the action of stopping the pulling. When the pulling of the lure is stopped, the movement of the lure is almost stopped in a place where the water hardly moves, such as a dead water region, or a coastal water area where there is hardly any tidal current or waves. There is a demand for a lure that attracts fish eaters, even when the lure is no longer moving in order to increase the hit rate.

An object of the present invention is to provide a lure that attracts fish eaters even when the lure is no longer moving.

A lure basically includes a body containing a cavity, a swinging part and a rod. The body is configured to move in a reeling direction. The swinging part is movably mounted in the body so as to be movable in the cavity after the body changes from a moving state to a stopped state. The rod extends inside the cavity in a thickness direction of the body with respect to the reeling direction. The rod has a pair of opposite ends. Each end of the rod is fixed to the body. The rod penetrates the swinging part.

A lure can also be arranged to basically include a body containing a cavity and a swinging part. The body is configured to move in a reeling direction. The swinging part is movably attached by at least one spring to the body so as to be movable in the cavity after the body changes from a moving state to a stopped state. The swinging part has a length extending along a tension direction of the at least one spring. The length of swinging part is longer than a length of the at least one spring that is extending between the body and the swinging part along a tension direction of the at least one spring.

A lure as described herein has a swinging part that is movably mounted inside a cavity of a body after the lure changes from a moving state to a stopped state and emits light received from outside the body. The light emitted from the swinging part is visible to the outside the body. The appearance of the light from the swinging part changes even after the lure is brought into a stopped state. The lure is able to attract fish eaters, even after the movement of the lure stops.

BRIEF DESCRIPTION OF THE DRAWINGS

Referring now to the attached drawings which form a part of this original disclosure.

DETAILED DESCRIPTION OF EMBODIMENTS

Selected embodiments will now be described in detail below based on preferred embodiments and with reference to the drawings, as appropriate. It will be apparent to those skilled in the fishing field from this disclosure that the following descriptions of the embodiments are provided for illustration only and not for the purpose of limiting the invention as defined by the appended claims and their equivalents.

First Embodiment

Figure 1:
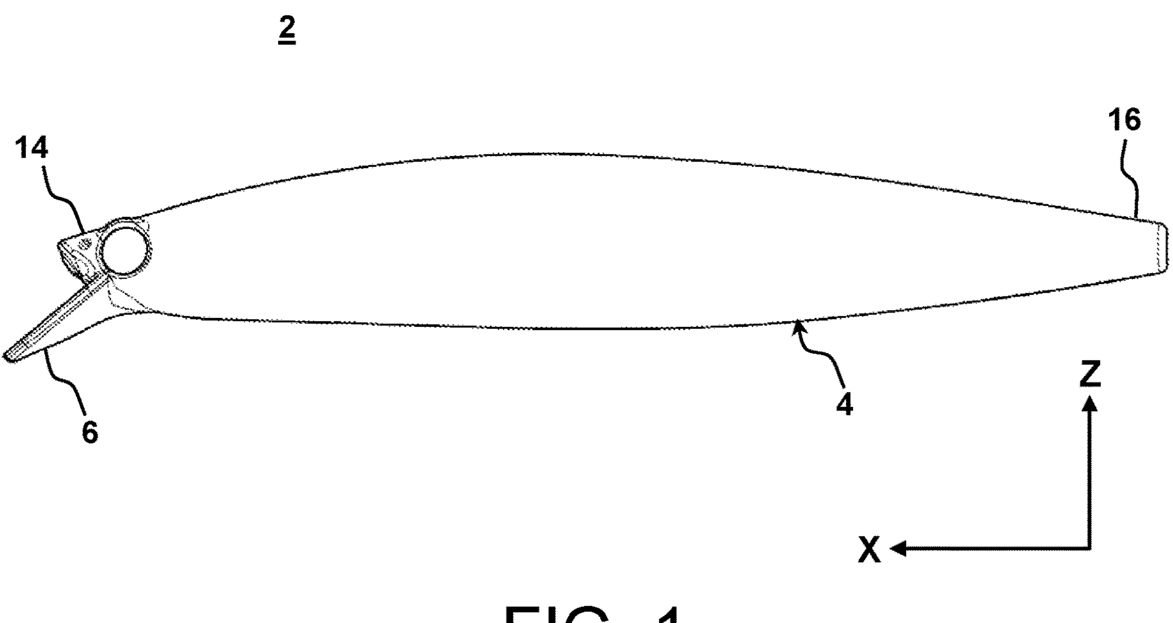
FIG. 1 is a side elevational view of a lure according to a first embodiment.
Figure 2:
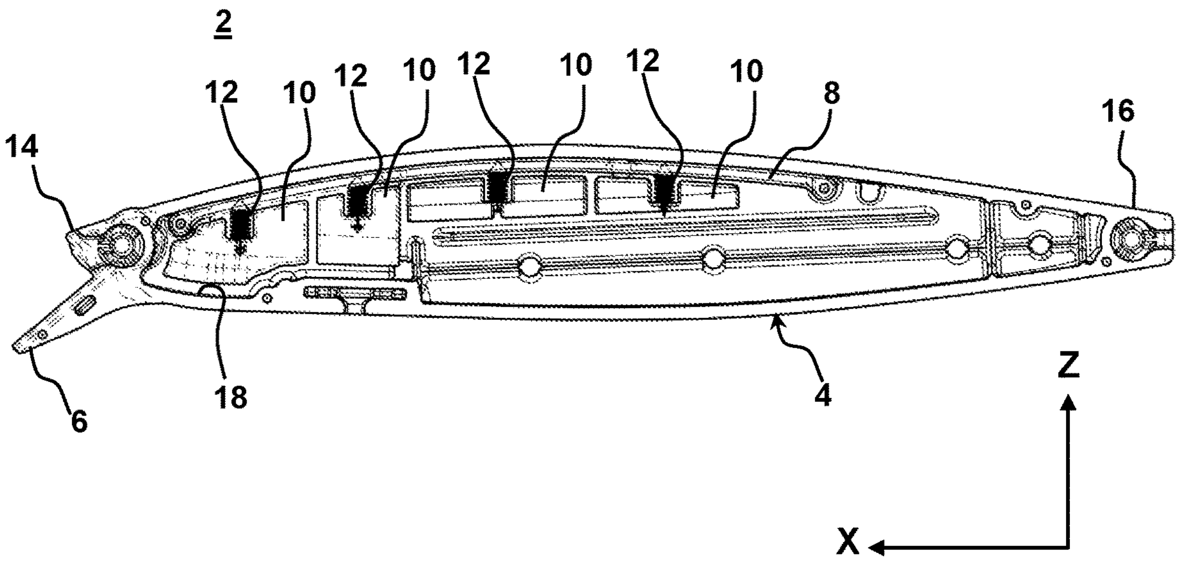
FIG. 2 is a side elevational view of a right-side part of the lure illustrated in FIG. 1, when the lure of FIG. 1 is divided into left and right parts.
Figure 3:
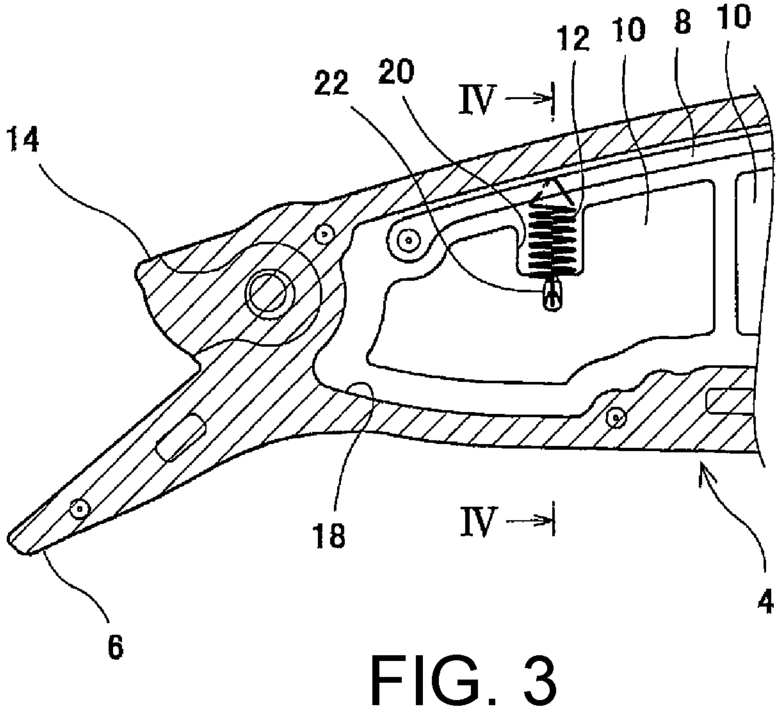
FIG. 3 is an enlarged view of a portion of the right-side part of the lure illustrated in FIG. 2.
Figure 4:
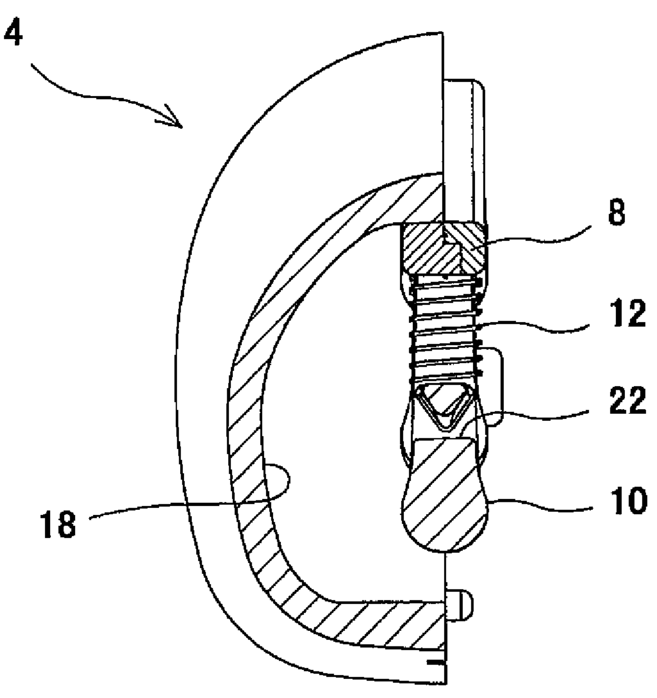
FIG. 4 is a cross-sectional view of the right-side part of the lure taken along section line IV-IV of FIG. 3.

FIG. 1 is a side elevational view illustrating a lure 2 according to one embodiment. In FIG. 1, the direction indicated by arrow X is defined as a front direction of the lure 2, and the opposite direction is the defined as a rear direction of the lure 2. The direction indicated by arrow Z is defined as an upper side direction of the lure 2 and the opposite direction is defined as an underside direction of the lure 2. The directions perpendicular to the plane of the paper are a left side direction and a right side direction of the lure 2. FIG. 2 is a side elevational view illustrating a right-side part of the lure 2, when the lure 2 of FIG. 1 is divided into left and right parts. FIG. 1 is a view in which the left half of the lure 2 is removed. In FIG. 1, the internal structure of the lure 2 can be seen. FIG. 3 is an enlarged view of a front portion of the lure 2 illustrated in FIG. 2. In FIG. 3, for the sake of simplicity, the hatched portion indicates the part that comes into contact with the left half when the left half of the lure 2 is attached. FIG. 4 is a cross-sectional view of the right-side part of the lure 2 taken along section line IV-IV of FIG. 3.

As shown in FIGS. 1 to 4, in the first embodiment, the lure 2 basically comprises a body 4, a lip 6, a suspension rod 8, a plurality of swinging parts 10, and a plurality of springs 12. While the lure 2 of FIGS. 1 to 4 includes four of the swinging parts 10, and four of the springs 12, it will be apparent from this disclosure that there can be fewer or more of the swinging parts 10 and fewer or more of the springs 12. For example, the lure 2 can have only one of the swinging parts 10 and only one of the springs 12 if needed and/or desired. Moreover, number of the springs 12 does not have to equal the number of the swinging parts 10.

The body 4 has an outer shape resembling a small fish, which is bait. Thus, the body 4 can also be called a bait fish body. The body 4 is formed from a hard material. Typically, the body 4 is formed from a synthetic resin composition. Alternatively, the body 4 is formed from a soft material such as an elastomer. The body 4 has a head 14 and a tail 16. As shown in FIGS. 2 to 4, the body 4 contains a cavity 18. The body 4 is of sufficient transparency to pass light into the cavity 18. Light from the interior of the body 4 is visible to the outside.

In this first embodiment, the air pressure of the cavity 18 is equivalent to atmospheric pressure. The air pressure of the cavity 18 can be reduced compared to normal atmospheric pressure. In this case, the air pressure inside the cavity 18 is below atmospheric pressure. The interior of the cavity 18 is at vacuum. In the lure 2, the right-side half and the left-side half of the body 4 are bonded by adhesion or welded together in order to maintain the depressurized state. The contacting portions between the right-side half and the left-side half of the body 4 can be sealed with rubber.

The lip 6 is formed from a hard material. Typically, the lip 6 is formed from a synthetic resin composition. As shown in FIGS. 1 to 3, the lip 6 is attached to the underside of the body 4. The lip 6 is positioned below the head 14. The lip 6 contributes to an appropriate underwater attitude as the lure 2 swims.

The suspension rod 8 is positioned in the cavity 18 of the body 4. As shown in FIGS. 2 and 3, the suspension rod 8 extends in a longitudinal direction of the body 4 along the upper surface of the cavity 18. The suspension rod 8 is rod-shaped. The front and rear ends of the suspension rod 8 are fixed to the body 4. Typically, the suspension rod 8 is formed from a synthetic resin composition.

As shown in FIGS. 2 to 4, the swinging parts 10 are positioned inside the cavity 18. As shown in FIG. 2, the swinging parts 10 are arranged in the longitudinal direction of the body 4. In this embodiment, four of the swinging parts 10 are positioned inside the cavity 18. As shown in FIGS. 3 and 4, each of the swinging parts 10 has the form of a plate. The swinging parts 10 extend in the longitudinal direction of the body 4. The swinging part 10 is attached such that an extension direction (a width direction) thereof is the longitudinal direction.

The swinging parts 10 emit light received from outside of the body 4. In this first embodiment, each of the swinging parts 10 includes a reflector. That is, each of the swinging part 10 includes a reflective surface that reflects light. Each of the swinging parts 10 can have a pair of oppositely facing reflective surfaces. The entire left and right side surfaces of the swinging parts 10 can be reflective surfaces. Alternatively, the left and right side surfaces of the swinging parts 10 can be only partially reflective. The reflective surfaces of the swinging parts 10 are glossy. The reflective surfaces of the swinging parts 10 can be colored or patterned. Typically, the swinging parts 10 are formed from a synthetic resin composition. The swinging parts 10 can be formed from metal. An example of a typical swinging parts 10 is a holoplate (i.e., a holographic plate). The swinging parts 10 can also be a fluorescent body.

As shown in FIG. 3, each of the swinging parts 10 has a notch 20 on the upper side. The notch 20 is positioned at the center of the swinging part 10 in the width direction. The swinging part 10 further comprises a mounting hole 22 below the notch 20.

The spring 12 is positioned inside the notch 20 of the swinging part 10. An upper end of the spring 12 is suspended from the suspension rod 8. The spring 12 is suspended from the body 4 via the suspension rod 8. A lower end of the spring 12 is hooked on the mounting hole 22 of the swinging part 10. The swinging part 10 is suspended from the lower end of the spring 12. The swinging part 10 is suspended from the suspension rod 8 via the spring 12. The swinging part 10 is able to oscillate with respect to the body 4 by the spring 12. The swinging part 10 can swing back and forth, up and down, and left and right, by the spring 12. The swinging part 10 is movable relative to the body 4 by the spring 12. The swinging part 10 is attached to the body 4 so as to be movable via the spring 12 and the suspension rod 8.

It is not necessary for the lure 2 to be provided with the suspension rod 8. The upper ends of the springs 12 can be directly connected to the upper surface of the cavity 18 of the body 4. It is sufficient if the swinging parts 10 are attached to the body 4 so as to be movable via the springs 12.

The number of springs 12 in the lure 2 for each of the swinging parts 10 is not limited to one. The swinging parts 10 can each be attached to the body 4 by two or more springs.

Although not shown, the lure 2 further includes a line eye, a hook eye, and a hook. The line eye forms a hole through which the line is passed. The line eye is formed by bending a metal wire. The line eye is firmly fixed to the body 4. The hook eye forms a hole for attaching a hook. The hook eye is formed by bending a metal wire. The hook eye is firmly fixed to the body 4. The hook is hung on the hook eye. The hook is attached to the hook eye so as to be movable.

Although not shown, the lure 2 further includes a weight. The weight is positioned inside the cavity 18. The weight is fixed to the body 4 in the cavity 18. The weight adjusts the attitude of the lure 2 when the lure 2 is made to swim.

The action and effects of the lure 2 of the first embodiment will now be described.

The lure 2 according to the first embodiment basically comprises, inside of the cavity 18 of the body 4, at least one the swinging part 10 that emits light received from outside of the body 4. The swinging part 10 includes a reflector. At least one surface of the swinging part 10 reflects light. The body 4 is of sufficient transparency to pass light into the cavity 18. Light reflected by the swinging part 10 is visible to the outside of the body 4. The light reflected by the swinging part 10 attracts fish eaters. A high hit rate can be expected with the lure 2.

Each of the swinging part 10 of the lure 2 is suspended from the suspension rod 8 by one of the spring 12. The swinging part 10 swings back and forth, up and down, and left and right by the spring 12 in a moving state of the lure 2, such as when the angler pulls the lure 2 or when the flow of the water or tide is fast. The state of the reflection of light changes due to the movement of the swinging part 10. The appearance of light emitted from the swinging part 10 changes. The swinging part 10 appears to scintillate. This effectively attracts fish eaters. A high hit rate can be expected with the lure 2.

The swinging part 10 of the lure 2 is suspended from the suspension rod 8 by the spring 12. The spring 12 continues to move for a while, even when the lure 2 changes from a moving state to a stopped state, such as when the angler stops pulling the lure 2 or when the flow of the water or tide stops. The swinging part 10 continues to swing back and forth, up and down, and left and right for a while, even when the lure 2 changes from the moving state to the stopped state. The swinging part 10 appears to scintillate at this time as well. The swinging part 10 continues to effectively attract fish eaters for a while, even after the lure 2 is brought into a stopped state. A high hit rate can be expected with the lure 2.

The tension of the spring 12 is adjusted by the weight of the swinging part 10 that is suspended from the spring 12. If the tension of the spring 12 is high, then the spring 12 will hardly stretch, even if the swinging part 10 is suspended from the spring. If the tension of the spring 12 is low, the spring 12 will be fully extended when the swinging part 10 is suspended from the spring. In either case, vertical oscillations do not readily occur, and the length of time that the oscillations continue is reduced. The tension of the spring 12 is appropriately adjusted so that the oscillations become large and continue for a long period of time. As a result, a high hit rate can be expected with the lure 2.

In this embodiment, the air pressure inside the cavity 18 is equivalent to atmospheric pressure. The lure 2 can be manufactured easily and inexpensively. As described above, the air pressure of the cavity 18 can be reduced compared to normal atmospheric pressure. In this case, the interior of the cavity 18 is at vacuum. With the lure 2, the swinging part 10 is less likely to be affected by air resistance. Compared to a case in which the interior of the cavity 18 is not depressurized, the swinging part 10 oscillates easily. Compared to a case in which the interior of the cavity 18 is not depressurized, the swinging part 10 can swing for a longer period of time, even after the lure 2 changes from the moving state to the stopped state. The swinging part 10 continues to effectively attract fish eaters, even after the lure 2 is brought into a stopped state. A high hit rate can be expected with the lure 2.

As described above, the swinging part 10 continues to swing back and forth, up and down, and left and right for a while, even when the lure 2 changes from the moving state to the stopped state. The period of time that the lure 2 oscillates is preferably 3 seconds or more, more preferably 5 seconds or more, and even more preferably 10 seconds or more.

As described above, the swinging part 10 has the form of a plate, and the swinging part 10 is preferably attached so as to extend in the longitudinal direction. With this type of configuration, the swinging part 10 is readily visible from the side surface of the lure 2. The light reflected by the swinging part 10 effectively attracts fish eaters. A high hit rate can be expected with the lure 2.

Second Embodiment

Figure 5:
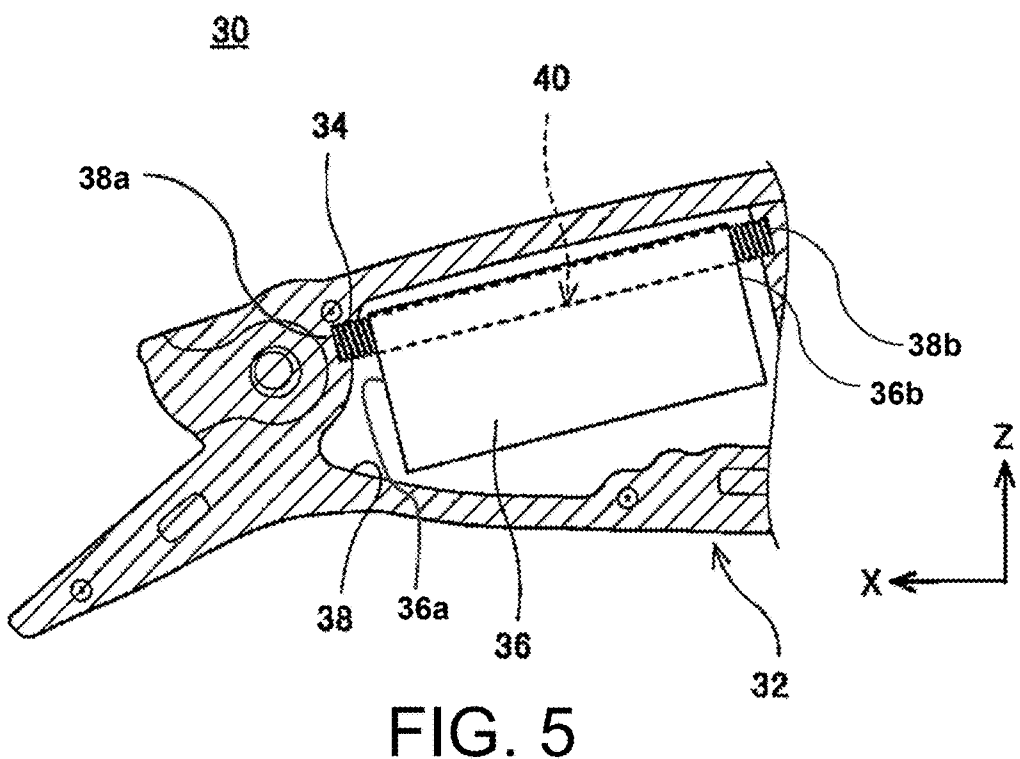
FIG. 5 is an enlarged view of a portion of a right-side part of a lure according to a second embodiment, when the lure is divided into left and right parts.

FIG. 5 is a view illustrating a lure 30 according to a second embodiment. FIG. 5 is an enlarged view of a right-side part of the lure 30, when the lure 30 is divided into left and right parts. In FIG. 5, for the sake of simplicity, the hatched portion indicates the part that comes into contact with the left half when the left half of the lure 30 is attached. In FIG. 5, the direction indicated by arrow X is defined as the front direction of the lure 30 and the opposite direction is the defined as the rear direction of the lure 30. The direction indicated by arrow Z is defined as the upper side direction of the lure 30 and the opposite direction is defined as the underside direction of the lure 30. The directions perpendicular to the plane of the paper are the left side direction and the right side direction of the lure 30. The lure 30 comprises a body 32, a spring 34, and a swinging part 36.

The body 32 is formed from a hard material. Typically, the body 32 is formed from a synthetic resin composition. Alternatively, the body 32 is formed from a soft material such as an elastomer. The body 32 contains a cavity 38. The body 32 is of sufficient transparency to pass light into the cavity 38. Light from the interior of the body 32 is visible to outside of the body 32. The air pressure of the cavity 38 is equivalent to atmospheric pressure. Alternatively, the interior of the cavity 38 is depressurized relative to normal atmospheric pressure.

The spring 34 is positioned within the cavity 38. The spring 34 extends in the longitudinal direction of the body 32. The two ends of the spring 34 are fixed to the body 32.

The swinging part 36 is positioned inside the cavity 38. The swinging part 36 has a plate shape. Although not shown, preferably, a plurality of the swinging parts 36 are arranged in the longitudinal direction of the body 32. The swinging part 36 extends in the longitudinal direction. The swinging part 36 is attached such that an extension direction thereof is the longitudinal direction.

The swinging parts 36 emit light received from the outside. In this embodiment, each of the swinging parts 36 is a fluorescent body. Fluorescent paint is applied to a left side surface and a right side surface of the swinging parts 36. Thus, the left side surface and the right side surface of the swinging parts 36 are reflective surfaces. The surfaces of the swinging parts 36 can be colored or patterned. Typically, the swinging parts 36 are formed from a synthetic resin composition. The swinging parts 36 can be formed from metal. The swinging parts 36 can also include a reflector.

The upper end portions of the swinging parts 36 are bulged. The bulged portions of the swinging parts 36 are each provided with a mounting hole 40 that passes therethrough in the extension direction (the width direction). The spring 34 passes through the mounting hole 40. As a result, the swinging parts 36 are each suspended from one of the springs 34. The swinging parts 36 are able to oscillate with respect to the body 32 by the oscillation of the spring 34. The swinging parts 36 can swing back and forth, up and down, and left and right by the springs 34. The swinging parts 36 is movable relative to the body 32 by the springs 34. The swinging parts 36 are attached to the body 32 so as to be movable via the springs 34.

The location where the mounting hole 40 is provided can instead be the central portion of the swinging part 36. The spring 34 passes through the mounting hole 40 positioned at the center of the swinging part 36. The position where the mounting hole 40 is provided can instead be between the upper end and the central portion of the swinging part 36.

The lure 30 according to the second embodiment basically comprises at least one of the swinging parts 36 inside the cavity 38 of the body 32 such that the swinging part 36 that emits light received from outside of the body 32. The swinging part 36 is a fluorescent body. The body 32 is of sufficient transparency to pass light into the cavity 38. The light emitted from the swinging part 36 is visible to the outside. The light reflected by the swinging part 36 attracts fish eaters. A high hit rate can be expected with the lure 30.

The swinging parts 36 of the lure 30 are suspended from the springs 34, which extend in the longitudinal direction, the two ends of the springs 34 which are fixed to the body 32. Each of the swinging parts 36 includes a first longitudinal end 36*a* and a second longitudinal end 36*b*. Each of the two ends of the springs 34 connect to an internal surface of the cavity 38 at a first connecting point 38*a* or a second connecting point 38*b*. The swinging parts 36 can swing back and forth, up and down, and left and right relative to the body 32. The swinging parts 10 swing back and forth, up and down, and left and right in a moving state of the lure 30, such as when the angler pulls the lure 30 or when the flow of the water or tide is fast. The appearance of the light emitted from the swinging parts 36 changes in accordance with the movement of the swinging part 36. The swinging parts 36 appear to scintillate. This effectively attracts fish eaters. A high hit rate can be expected with the lure 30.

The swinging parts 36 of the lure 30 continue to move for a while by the springs 34, even when the lure 30 changes from the moving state to the stopped state, such as when the angler stops pulling the lure 30 or when the flow of the water or tide stops. The swinging parts 36 continue to swing back and forth, up and down, and left and right for a while, even when the lure 30 changes from the moving state to the stopped state. The swinging parts 36 appear to scintillate at this time as well. The swinging parts 36 continue to effectively attract fish eaters for a while, even after the lure 30 is brought into a stopped state. A high hit rate can be expected with the lure 30.

Third Embodiment

Figure 6:
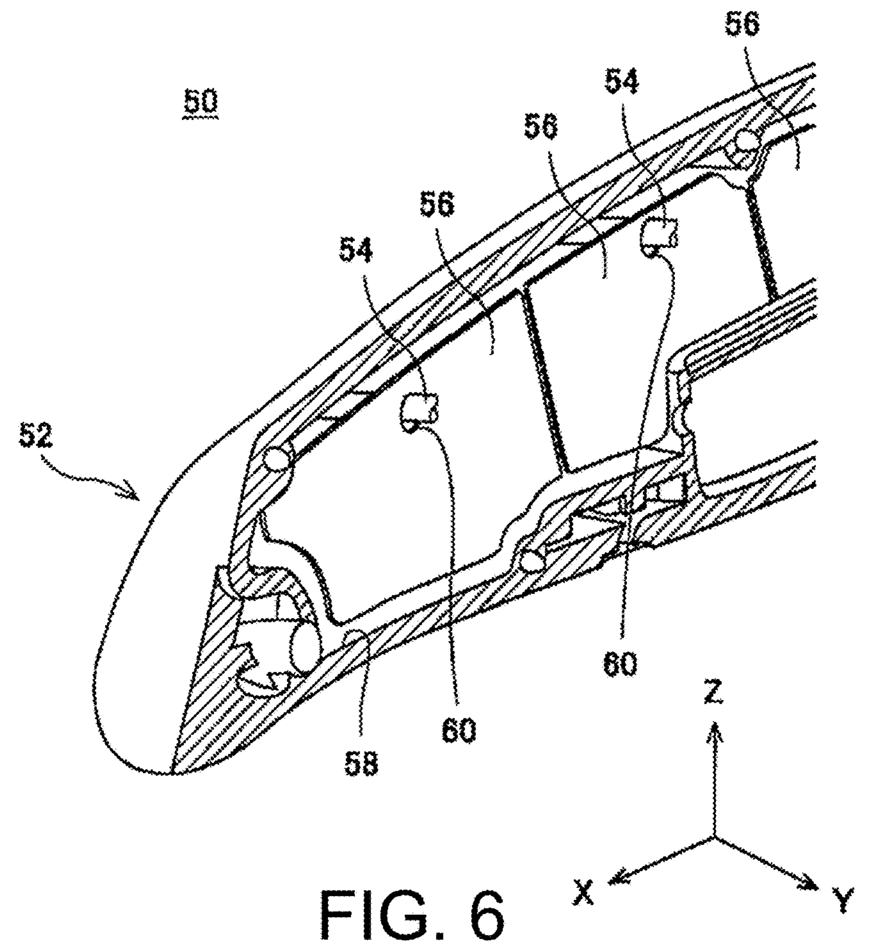
FIG. 6 is an enlarged perspective view of a portion of a right-side part of a lure according to a third embodiment, when the lure is divided into left and right parts.

FIG. 6 is a perspective view illustrating a lure 50 according to a third embodiment. In FIG. 6, the direction indicated by arrow X is defined as the front direction of the lure 50 and the opposite direction is the defined as the rear direction of the lure 50. The direction indicated by arrow Y is defined as the left side direction of the lure 50 and the opposite direction is defined as the right side direction of the lure 50. The direction indicated by arrow Z is defined as the upper side direction of the lure 50 and the opposite direction is defined as the underside direction of the lure 50.

FIG. 6 is an exploded view illustrating a right-side part when the lure 50 is divided into left and right parts. FIG. 6 shows a view in which the left half of the lure 50 has been removed. In FIG. 6, for the sake of simplicity, the hatched portion indicates the part that comes into contact with the left half when the left half of the lure 50 is attached. FIG. 6 shows the front side portion of the lure 50. The lure 50 comprises a body 52, a suspension rod 54, and a plurality of swinging parts 56.

The body 52 is formed from a hard material. Typically, the body 52 is formed from a synthetic resin composition. The body 52 can also be formed from a soft material such as an elastomer. The body 52 contains a cavity 58. The body 52 is of sufficient transparency to pass light into the cavity 58. Light from the interior of the body 52 is visible to the outside. The air pressure inside the cavity 58 is equivalent to atmospheric pressure. The interior of the cavity 58 can be depressurized relative to normal atmospheric pressure.

The suspension rod 54 is positioned in the cavity 58 of the body 52. As shown in FIG. 6, a plurality of the suspension rods 54 that extend in the left-right direction are arranged in the longitudinal direction. Each of the suspension rods 54 is rod-shaped. The right end of the suspension rod 54 is fixed to the body 52. Although FIG. 6 gives only a partial view of the suspension rod 54, the left end of the suspension rod 54 is also fixed to the body 52. Typically, the suspension rod 54 is formed from a synthetic resin composition.

The swinging part 56 is positioned inside the cavity 58. As shown in FIG. 6, the swinging part 56 has the form of a plate. A plurality of the swinging parts 56 are arranged in the longitudinal direction. The swinging part 56 extends in the longitudinal direction. The swinging part 56 is attached such that the direction of extension thereof is the longitudinal direction.

The swinging part 56 emits light received from the outside. In this embodiment, the swinging part 56 is a reflector. That is, the surface of the swinging part 56 reflects light. The surface of the swinging part 56 is glossy. The surface of the swinging part 56 can be colored or patterned. Typically, the swinging part 56 is formed from a synthetic resin composition. The swinging part 56 can be formed from metal. An example of a typical swinging part 56 is a holoplate.

As shown in FIG. 6, each of the swinging parts 56 has a mounting hole 60. The mounting hole 60 passes through the swinging part 56 in the thickness direction of the swinging part 56. The suspension rod 54 passes through the mounting hole 60. The swinging part 56 is thereby suspended from the suspension rod 54. As shown in the figure, the internal diameter of the mounting hole 60 is larger than the external diameter of the suspension rod 54. The swinging part 56 is able to oscillate with respect to the suspension rod 54. The swinging part 56 is able to swing left and right relative to the suspension rod 54. The swinging part 56 is attached to the body 52 so as to be movable via the suspension rod 54.

The lure 50 according to the present invention comprises, inside the cavity 58 of the body 52, the swinging part 56 that emits light received from the outside. The swinging part 56 is a reflector. The surface of the swinging part 56 reflects light. The body 52 is of sufficient transparency to pass light into the cavity 58. The light reflected by the swinging part 56 is visible to the outside. The light reflected by the swinging part 56 attracts fish eaters. A high hit rate can be expected with the lure 50.

The swinging part 56 of the lure 50 is suspended from the suspension rod 54. The swinging part 56 is able to swing left and right relative to the suspension rod 54. The swinging part 56 swings left and right in a moving state of the lure 50, such as when the angler pulls the lure 50 or when the flow of the water or tide is fast. The state of the reflection of light changes due to the movement of the swinging part 56. The appearance of the light emitted from the swinging part 56 changes. The swinging part 56 appears to scintillate. This effectively attracts fish eaters. A high hit rate can be expected with the lure 50.

The swinging part 56 of the lure 50 continues to oscillate for a while, even when the lure 50 changes from the moving state to the stopped state, such as when the angler stops pulling the lure 50 or when the flow of the water or tide stops. The swinging part 56 appears to scintillate at this time as well. The swinging part 56 continues to effectively attract fish eaters for a while, even after the lure 50 is brought into a stopped state. A high hit rate can be expected with the lure 50.

Fourth Embodiment

Figure 7:
FIG. 7 is a perspective view of a portion of a lure according to a fourth embodiment.
Figure 7:
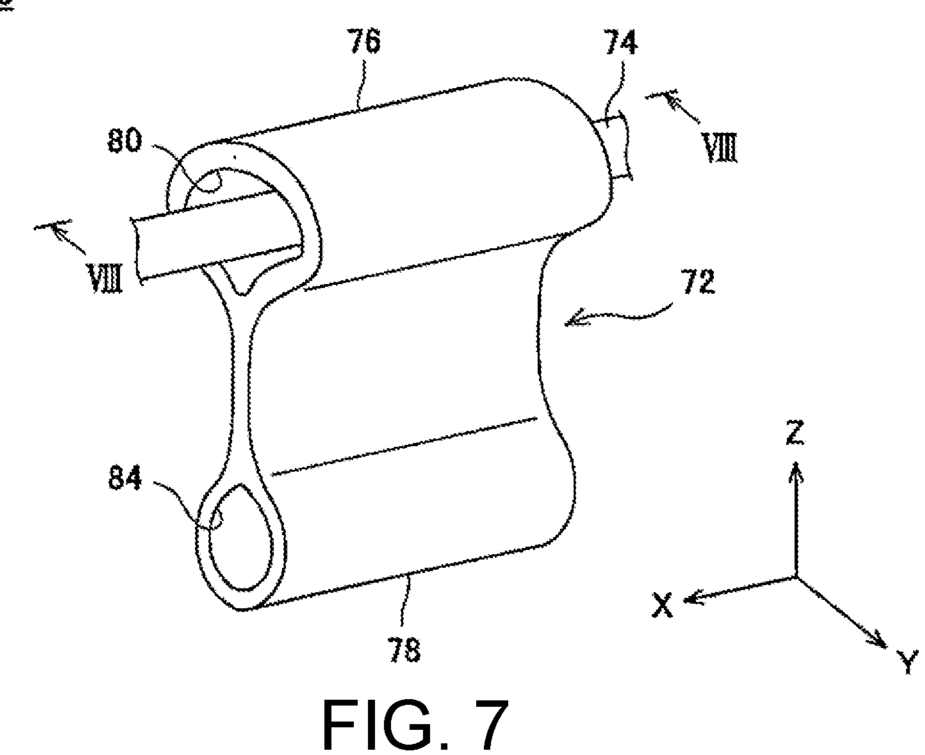

FIG. 7 is a perspective view illustrating a swinging part 72 and a suspension rod 74 of a lure 70 according to a fourth embodiment. In FIG. 7, the direction indicated by arrow X is defined as the front direction of the lure 70, and the opposite direction is the defined as the rear direction of the lure 70. The direction indicated by arrow Y is defined as the left side direction of the lure 70, and the opposite direction is defined as the right side direction of the lure 70. The direction indicated by arrow Z is defined as the upper side direction of the lure 70, and the opposite direction is defined as the underside direction of the lure 70. Although not shown, the lure 70 further includes a body.

The body is formed from a hard material. Typically, the body is formed from a synthetic resin composition. The body can also be formed from a soft material such as an elastomer. The body contains a cavity. The body is of sufficient transparency to pass light into the cavity. Light from the interior of the body is visible to the outside. The air pressure inside the cavity is equivalent to atmospheric pressure. The cavity interior can be depressurized relative to normal atmospheric pressure.

The suspension rod 74 is positioned in the cavity of the body. The suspension rod 74 extends in the longitudinal direction along the upper surface of the cavity. The suspension rod 74 is rod-shaped. The front and rear ends of the suspension rod 74 are fixed to the body.

The swinging part 72 is positioned inside the cavity 38. Although not shown, a plurality of the swinging parts 72 are arranged in the longitudinal direction. As shown in FIG. 7, the swinging part 72 has the form of a plate in which an upper end portion 76 and a lower end portion 78 are bulged. The swinging part 72 extends in the longitudinal direction. The swinging part 72 is attached such that the direction of extension thereof is the longitudinal direction.

The swinging part 72 emits light received from the outside. In this embodiment, the swinging part 72 is a reflector. The surface of the swinging part 72 reflects light. The surface of the swinging part 72 is glossy. The surface of the swinging part 72 can be colored or patterned. A material having little friction with the suspension rod 74 is selected as the material for the swinging part 72. Typically, the swinging part 72 is formed from a synthetic resin composition. The swinging part 72 can be formed from metal. An example of a typical swinging part 72 is a holoplate.

Figure 8:
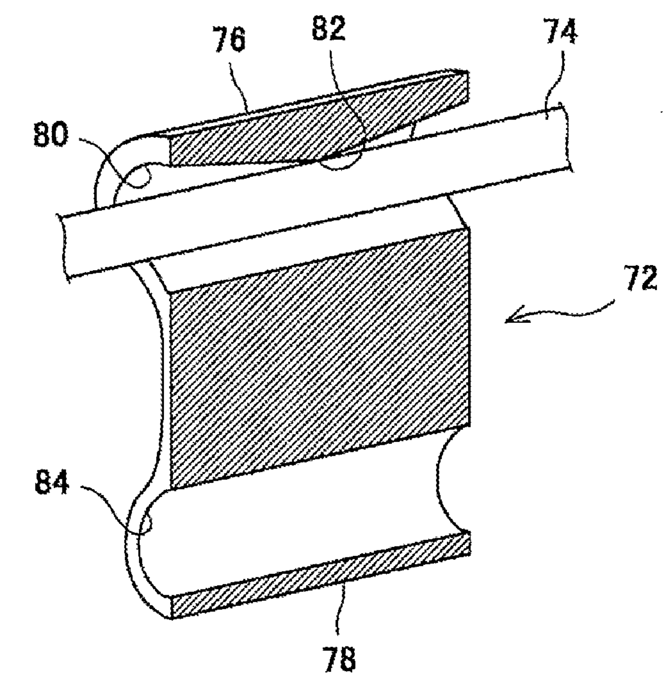
FIG. 8 is a cross-sectional perspective view of the portion of the lure taken along section line VIII-VIII of FIG. 7.

FIG. 8 is a cross-sectional perspective view of the swinging part 72 taken along line VIII-VIII of FIG. 7. This is a cross section in which the swinging part 72 has been cut along the direction of extension at the center in the thickness direction. As shown in FIGS. 7 and 8, the upper end portion 76 is provided with a mounting hole 80 that passes therethrough in the direction of extension. The swinging part 72 is provided with the mounting hole 80 that passes therethrough in the direction of extension. As shown in FIG. 8, the upper surface of the mounting hole 80 projects downward in a tapered shape in cross section. The upper surface of the mounting hole 80 has a top portion 82 that projects downward.

The suspension rod 74 passes through the mounting hole 80. The swinging part 72 is thus suspended from the suspension rod 74. As shown in FIGS. 7 and 8, the internal diameter of the mounting hole 80 is larger than the external diameter of the suspension rod 74. In the swinging part 72, the suspension rod 74 is in contact with the top portion 82 of the mounting hole 80. The swinging part 72 can oscillate with the top portion 82 as the reference point. The swinging part 72 can swing in a rotational direction with respect to a vertical direction axis, a rotational direction with respect to a left-right direction axis, and a rotational direction with respect to a longitudinal direction axis, with the top portion 82 as the base point. The swinging part 72 is attached to the body so as to be movable via the suspension rod 74.

As shown in FIGS. 7 and 8, the lower end portion 78 of the swinging part 72 is provided with a storage hole 84 that passes therethrough in the longitudinal direction. Although not shown, a weight for balancing the body can be housed in the storage hole 84.

The lure 70 according to the present invention comprises, inside the cavity of the body, the swinging part 72 that emits light received from the outside. The swinging part 72 is a reflector. The surface of the swinging part 72 reflects light. The body is of sufficient transparency to pass light into the cavity. The light reflected by the swinging part 72 is visible to the outside. The light reflected by the swinging part 72 attracts fish eaters. A high hit rate can be expected with the lure 70.

The swinging part 72 of the lure 70 is suspended from the suspension rod 74. The swinging part 72 oscillates in the moving state of the lure 70, such as when the angler pulls the lure 70 or when the flow of the water or tide is fast. The swinging part 72 swings in the rotational direction with respect to the vertical direction axis, the rotational direction with respect to the left-right direction axis, and the rotational direction with respect to the longitudinal direction axis, with the top portion 82 of the mounting hole 80 as the base point. The state of the reflection of light effectively changes due to the movement of the swinging part 72. The swinging part 72 appears to scintillate. This effectively attracts fish eaters. A high hit rate can be expected with the lure 70.

The swinging part 72 of the lure 70 continues to swing in the rotational direction with respect to the vertical direction axis, the rotational direction with respect to the left-right direction axis, and the rotational direction with respect to the longitudinal direction axis for a while, even when the lure 70 changes from the moving state to the stopped state, such as when the angler stops pulling the lure 70 or when the flow of the water or tide stops. The swinging part 72 appears to scintillate at this time as well. The swinging part 72 continues to effectively attract fish eaters for a while, even after the lure 70 is brought into a stopped state. A high hit rate can be expected with the lure 70.

As described above, the swinging part 72 has the form of a plate in which the upper end portion 76 is bulged. The bulged portion of the swinging part 72 also reflects light. In the lure 70, the swinging part 72 is easily visible from the top surface side as well. The light reflected by the swinging part 72 from the upper surface side effectively attracts fish eaters. A high hit rate can be expected with the lure 70.

As described above, the bulged portion at the lower end of the swinging part 72 is provided with the storage hole 84 that passes therethrough in the longitudinal direction. The weight used for adjusting the attitude can be placed in the storage hole 84. In the lure 70, the weight cannot be seen from the outside. The lure 70 has an excellent outer appearance.

Fifth Embodiment

Figure 9:
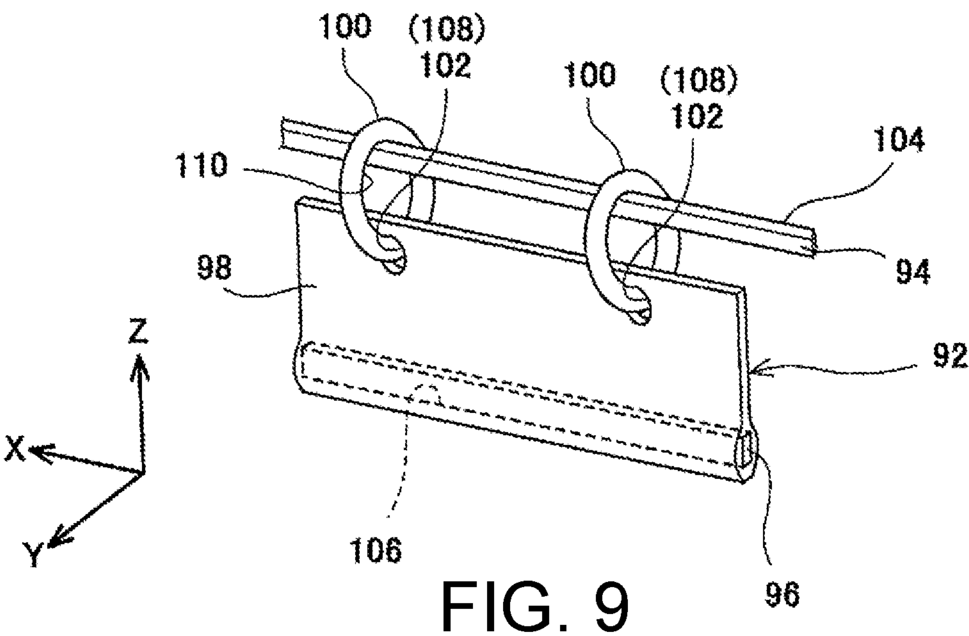
FIG. 9 is a perspective view of a portion of a lure according to a fifth embodiment.

FIG. 9 is a perspective view illustrating a swinging part 92, a suspension rod 94, and a weight 96 of a lure 90 according to yet another embodiment of the present invention. In FIG. 9, the direction indicated by arrow X is defined as the front direction of the lure 90 and the opposite direction is the defined as the rear direction of the lure 90. The direction indicated by arrow Y is defined as the left side direction of the lure 90 and the opposite direction is defined as the right side direction of the lure 90. The direction indicated by arrow Z is defined as the upper side direction of the lure 90 and the opposite direction is defined as the underside direction of the lure 90. Although not shown, the lure 90 further includes a body.

The body is formed from a hard material. Typically, the body is formed from a synthetic resin composition. The body can also be formed from a soft material such as an elastomer. The body contains a cavity. The body is of sufficient transparency to pass light into the cavity. Light from the interior of the body is visible to the outside. The air pressure inside the cavity is equivalent to atmospheric pressure. The cavity interior can be depressurized relative to normal atmospheric pressure.

The swinging part 92 is positioned inside the cavity. Although not shown, a plurality of the swinging parts 92 are arranged in the longitudinal direction. As shown in FIG. 9, the swinging part 92 comprises a plate-like main body 98 and a ring 100. In this embodiment, the swinging part 92 has two rings 100. The main body 98 extends in the longitudinal direction. The main body 98 has two mounting holes 102. Each of the mounting holes 102 passes through the main body 98 in the thickness direction of the main body 98. Each of the rings 100 passes through the corresponding mounting hole 102 of the main body 98. The respective number of the rings 100 and the mounting holes 102 can be one, or three or more.

The main body 98 emits light received from the outside. In this embodiment, the main body 98 is a reflector. The surface of the main body 98 reflects light. The surface of the main body 98 is glossy. The surface of the main body 98 can be colored or patterned. Typically, the main body 98 is formed from a synthetic resin composition. The main body 98 can be formed from metal. An example of a typical main body 98 is a holoplate.

The suspension rod 94 is positioned in the cavity of the body. Although not shown, the suspension rod 94 extends in the longitudinal direction along the upper surface of the cavity. The front and rear ends of the suspension rod 94 are fixed to the body. The upper side 104 of the suspension rod 94 is sharp. In the suspension rod 94, the upper side 104 has a knife-edge shape.

The suspension rod 94 passes through the ring 100. The swinging part 92 is thereby suspended from the suspension rod 94. The knife-edge portion of the suspension rod 94 comes into contact with the ring 100. The swinging part 92 is suspended from the suspension rod 94 so as to be in contact with the knife-edged portion of the suspension rod 94. The ring 100 of the swinging part 92 is able to swing left and right relative to the suspension rod 94. The ring 100 of the swinging part 92 is able to swing back and forth relative to the suspension rod 94. The swinging part 92 is able to swing back and forth and left and right relative to the suspension rod 94. The swinging part 92 is attached to the body so as to be movable via the suspension rod 94.

As shown in FIG. 9, the lower end portion of the swinging part 92 is provided with a storage hole 106 that passes therethrough in the longitudinal direction. The weight 96 is housed in the storage hole 106. The weight 96 balances the body such that the lure 90 has an appropriate attitude.

The lure 90 according to the present invention comprises, inside the cavity of the body, the swinging part 92 that emits light received from the outside. The swinging part 92 is a reflector. The surface of the main body 98 of the swinging part 92 reflects light. The body is of sufficient transparency to pass light into the cavity. The light reflected by the swinging part 92 is visible to the outside. The light reflected by the swinging part 92 attracts fish eaters. A high hit rate can be expected with the lure 90.

The swinging part 92 of the lure 90 is suspended from the suspension rod 94 so as to be in contact with the knife-edge upper side 104 of the suspension rod 94. Since the width of the knife-edge upper side 104 is narrow, the ring 100 of the swinging part 92 swings easily to the left and right relative to the suspension rod 94. Furthermore, the ring 100 of the swinging part 92 can also swing back and forth relative to the suspension rod 94. The swinging part 92 oscillates in the moving state of the lure 90, such as when the angler pulls the lure 90 or when the flow of the water or tide is fast. The state of the reflection of light effectively changes due to the movement of the swinging part 92. The swinging part 92 appears to scintillate. This effectively attracts fish eaters.

The swinging part 92 of the lure 90 continues to swing back and forth and left and right for a while, even when the lure 90 changes from the moving state to the stopped state, such as when the angler stops pulling the lure 90 or when the flow of the water or tide stops. The swinging part 92 appears to scintillate at this time as well. The swinging part 92 continues to effectively attract fish eaters for a while, even after the lure 90 is brought into a stopped state. A high hit rate can be expected with the lure 90.

An inner circumferential surface 108 of the mounting hole 102 of the main body 98 can be in the form of a knife edge as well. The main body 98 swings easily to the left and right relative to the ring 100. The inner circumferential surface 110 of the ring 100 can be in the form of a knife edge as well. The ring 100 swings easily back and forth relative to the suspension rod 94, and the main body 98 swings easily back and forth relative to the ring 100. The swinging part 92 effectively attracts fish eaters. A high hit rate can be expected with the lure 90.

Sixth Embodiment

Figure 10:
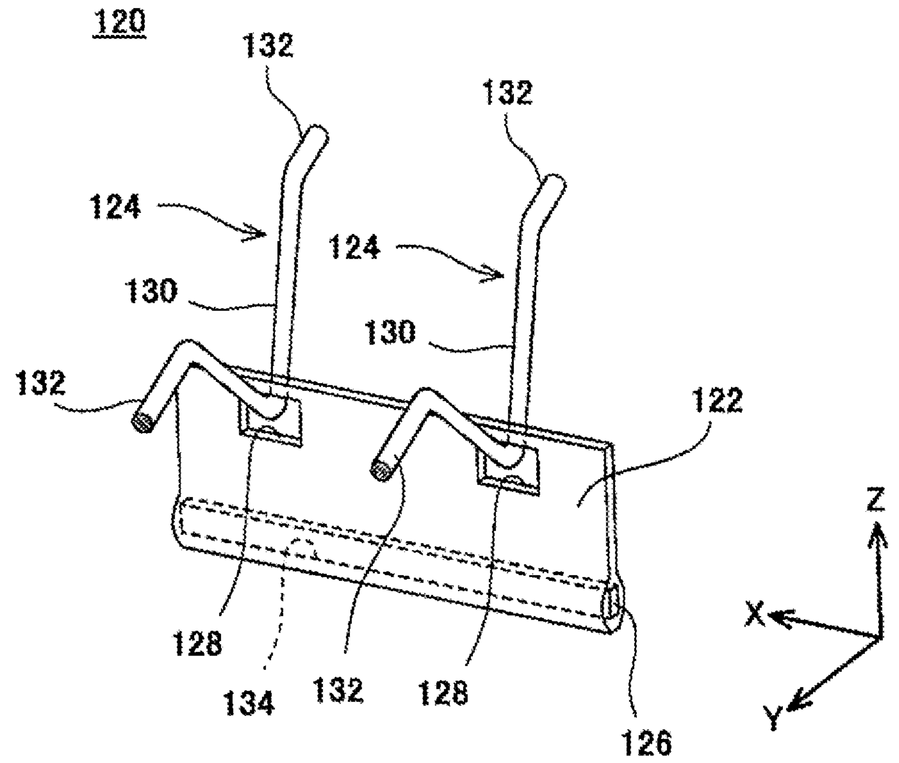
FIG. 10 is a perspective view of a portion of a lure according to a sixth embodiment.

FIG. 10 is a perspective view illustrating a swinging part 122, a hanger 124, and a weight 126 of a lure 120 according to yet another embodiment of the present invention. In FIG. 10, the direction indicated by arrow X is defined as the front direction of the lure 120, and the opposite direction is the defined as the rear direction of the lure 120. The direction indicated by arrow Y is defined as the left side direction of the lure 120, and the opposite direction is defined as the right side direction of the lure 120. The direction indicated by arrow Z is defined as the upper side direction of the lure 120, and the opposite direction is defined as the underside direction of the lure 120. Although not shown, the lure 120 further includes a body.

The body is formed from a hard material. Typically, the body is formed from a synthetic resin composition. The body can also be formed from a soft material such as an elastomer. The body contains a cavity. The body is of sufficient transparency to pass light into the cavity. Light from the interior of the body is visible to the outside. The air pressure inside the cavity is equivalent to the atmospheric pressure. The cavity interior can be depressurized relative to normal atmospheric pressure.

The swinging part 122 is positioned inside the cavity. Although not shown, a plurality of the swinging parts 122 are arranged in the longitudinal direction. The swinging part 122 has the form of a plate. The swinging part 122 extends in the longitudinal direction. As shown in FIG. 10, the swinging part 122 has a mounting hole 128. In this embodiment, the swinging part 122 has two mounting holes 128. Each of the mounting holes 128 passes through the swinging part 122 in the thickness direction of the swinging part 122.

The swinging part 122 emits light received from the outside. In this embodiment, the swinging part 122 is a reflector. The surface of the swinging part 122 reflects light. The surface of the swinging part 122 is glossy. The surface of the swinging part 122 can be colored or patterned. A material that produces little friction with the hanger 124 is selected as the material for the swinging part 122. Typically, the swinging part 122 is formed from a synthetic resin composition. The swinging part 122 can be formed from metal. An example of a typical swinging part 122 is a holoplate.

The hanger 124 is positioned in the cavity of the body. In this embodiment, there are two hangers 124. Each of the hangers 124 extends in the left-right direction. A central portion of the hanger 124 is curved downward. In other words, the hanger 124 has a curved portion 130 located at the center and a pair of linear portions 132 located on both sides of the curved portion 130. The two ends of the hanger 124 are attached to the body. The hanger 124 is rotatable about an axis of the linear portions 132. That is, the curved portion 130 of the hanger 124 can swing in the longitudinal direction. The hanger 124 can swing relative to the body.

Each of the hangers 124 passes through the corresponding mounting hole 128. The swinging part 122 is thereby suspended from the hanger 124. The swinging part 122 is hung at the bottom of the curved portion 130. The swinging part 122 can swing back and forth together with the curved portion 130. Furthermore, the swinging part 122 can swing in the left-right direction relative to the hanger 124. The swinging part 122 can swing back and forth and left and right with respect to the body. The swinging part 122 is attached to the body so as to be movable via the hanger 124.

The number of hangers 124 and the number of mounting holes 128 can be one each. The number of hangers 124 and the number of mounting holes 128 can be three or more each.

Although not shown, the configuration can be also such that the hanger can swing in the left-right direction relative to the body, and the swinging part is suspended from the hanger.

As shown in FIG. 10, the lower end portion of the swinging part 122 is provided with a storage hole 134 that passes therethrough in the longitudinal direction. The weight 126 is housed in the storage hole 134. The weight 126 balances the body such that the lure 120 assumes an appropriate attitude.

The lure 120 according to the present invention comprises, inside the cavity of the body, the swinging part 122 that emits light received from the outside. The swinging part 122 is a reflector. The surface of the swinging part 122 reflects light. The body is of sufficient transparency to pass light into the cavity. The light reflected by the swinging part 122 is visible to the outside. The light reflected by the swinging part 122 attracts fish eaters. A high hit rate can be expected with the lure 120.

The swinging part 122 of the lure 120 is hooked on the bottom of the curved portion 130 of the hanger 124. The curved portion 130 of the hanger 124 can swing in the longitudinal direction. The swinging part 122 can swing back and forth relative to the body together with the curved portion 130. Furthermore, the swinging part 122 can swing in to the left and right relative to the hanger 124. The swinging part 122 oscillates in a moving state of the lure 120, such as when the angler pulls the lure 120 or when the flow of the water or tide is fast. The state of the reflection of light effectively changes due to the movement of the swinging part 122. The swinging part 122 appears to scintillate. This effectively attracts fish eaters.

The swinging part 122 of the lure 120 continues to swing back and forth and left and right for a while, even when the lure 120 changes from the moving state to the stopped state, such as when the angler stops pulling the lure 120 or when the flow of the water or tide stops. The swinging part 122 appears to scintillate at this time as well. The swinging part 122 continues to effectively attract fish eaters for a while, even after the lure 120 is brought into a stopped state. A high hit rate can be expected with the lure 120.

Seventh Embodiment

Figure 11:
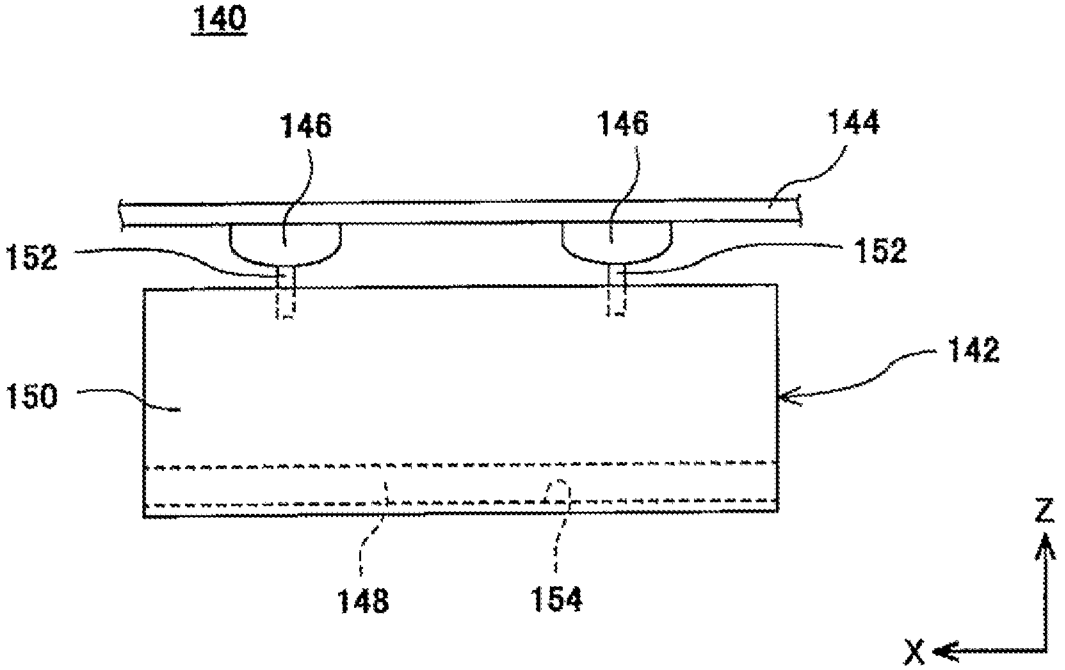
FIG. 11 is a side view of a portion of a lure according to a seventh embodiment.

FIG. 11 is a perspective view illustrating a swinging part 142, a suspension rod 144, a magnet 146, and a weight 148 of a lure 140 according to yet another embodiment of the present invention. In FIG. 11, the direction indicated by arrow X is defined as the front direction of the lure 140, and the opposite direction is the defined as the rear direction of the lure 140. The direction indicated by arrow Z is defined as the upper side direction of the lure 140, and the opposite direction is defined as the underside direction of the lure 140. Although not shown, the lure 140 further includes a body.

The body is formed from a hard material. Typically, the body is formed from a synthetic resin composition. The body can also be formed from a soft material such as an elastomer. The body contains a cavity. The body is of sufficient transparency to pass light into the cavity. Light from the interior of the body is visible to the outside. The air pressure inside the cavity is equivalent to atmospheric pressure. The cavity interior can be depressurized relative to normal atmospheric pressure.

The swinging part 142 is positioned inside the cavity. Although not shown, a plurality of the swinging parts 142 is arranged in the longitudinal direction. As shown in FIG. 11, the swinging part 142 comprises a plate-like main body 150 and an attachment lug 152. The main body 150 extends in the longitudinal direction. The attachment lug 152 is fixed to an upper portion of the main body 150. In this embodiment, two attachment lugs 152 are fixed to the upper portion of the main body 150. The attachment lug 152 is made of metal. Typical materials for the attachment lug 152 are steel and aluminum alloy.

The main body 150 emits light received from the outside. In this embodiment, the main body 150 is a reflector. The surface of the main body 150 reflects light. The surface of the main body 150 is glossy. The surface of the main body 150 can be colored or patterned. Typically, the main body 150 is formed from a synthetic resin composition. An example of a typical main body 150 is a holoplate.

The suspension rod 144 is positioned in the cavity of the body. Although not shown, the suspension rod 144 extends in the longitudinal direction along the upper surface of the cavity. The front and rear ends of the suspension rod 144 are fixed to the body. In this embodiment, the suspension rod 144 is in the form of a rectangular column. The cross section of the suspension rod 144 is quadrangular.

The magnet 146 is fixed to the suspension rod 144. The magnet 146 is fixed to the bottom surface of the suspension rod 144. In this embodiment, two magnets 146 are fixed to the suspension rod 144. The distance between the magnets 146 is equivalent to the distance between the attachment lugs 152 of the swinging part 142. The lower surface of each of the magnets 146 is hemispherical, convexly downward.

Each of the attachment lugs 152 of the swinging part 142 is magnetically attached to the corresponding magnet 146. As a result, the swinging part 142 is suspended from the suspension rod 144. The swinging part 142 can swing back and forth and left and right with respect to the magnet 146. The swinging part 142 can swing back and forth and left and right with respect to the body. The swinging part 142 is attached to the body so as to be movable via the suspension rod 144 and the magnet 146.

It is not necessary for the lure 140 to be provided with the suspension rod 144. The magnet 146 can be directly fixed to the upper surface of the cavity of the body. It is sufficient if the swinging part 142 is attached to the body so as to be movable via the magnet 146.

The number of magnets 146 and the number of attachment lugs 152 of the lure 140 can be one each. In this case, the attachment lug 152 is located at the center of the main body 150 in the longitudinal direction. The swinging part 142 is attached to the body by means of one of the magnets 146. The swinging part 142 can swing back and forth and left and right with respect to the magnet 146. The swinging part 142 is attached to the body so as to be movable via the magnet 146. The number of magnets 146 and the number of attachment lugs 152 can be three or more each.

As shown in FIG. 11, the lower end portion of the swinging part 142 is provided with a storage hole 154 that passes therethrough in the longitudinal direction. The weight 148 is housed in the storage hole 154. The weight 148 balances the body such that the lure 140 has an appropriate attitude.

The lure 140 according to the present invention comprises, inside the cavity of the body, the swinging part 142 that emits light received from the outside. The main body 150 of the swinging part 142 is a reflector. The surface of the main body 150 of the swinging part 142 reflects light. The body is of sufficient transparency to pass light into the cavity. The light reflected by the swinging part 142 is visible to the outside. The light reflected by the swinging part 142 attracts fish eaters. A high hit rate can be expected with the lure 140.

In the swinging part 142 of the lure 140, the attachment lug 152 is magnetically attached to the lower surface of the magnet 146. The lower surface of the magnet 146 is hemispherical. The swinging part 142 can swing back and forth and left and right with respect to the magnet 146. The swinging part 142 oscillates in a moving state of the lure 140, such as when the angler pulls the lure 140 or when the flow of the water or tide is fast. The state of the reflection of light effectively changes due to the movement of the swinging part 142. The swinging part 142 appears to scintillate. This effectively attracts fish eaters.

The swinging part 142 of the lure 140 continues to swing back and forth and left and right for a while, even when the lure 140 changes from the moving state to the stopped state, such as when the angler stops pulling the lure 140 or when the flow of the water or tide stops. The swinging part 142 appears to scintillate at this time as well. The swinging part 142 continues to effectively attract fish eaters for a while, even after the lure 140 is brought into a stopped state. A high hit rate can be expected with the lure 140.

OTHER EMBODIMENTS

The method for attaching the swinging part to the body so as to be movable is not limited to the embodiments described above. For example, the swinging parts can be attached to the body via a rubber. The swinging parts can be attached to the body via a hinge. The swinging parts can be attached to the body via a universal joint. It is sufficient if the swinging parts are attached to the body such that the swinging parts continue to move relative to the body for a while after the lure changes from the moving state to the stopped state.

The present invention has been described above by embodiments of lures for fish. Although not mentioned above, the present invention can also be applied to lures for marine animals other than fish, such as a bait log.

As described above, the lures according to the present disclosure can effectively attract fish eaters. The lures can attract fish eaters, even after the state of the lure changes from the moving state to the stopped state. The advantages of the lures of the present disclosure are therefore obvious.

The lures according to the present disclosure are suitable for fishing in various types of bodies of water, such as lakes, ponds, dams, rivers, and oceans.

What is claimed is:

1. A lure comprising:

a body having a cavity having an upper portion and a lower portion, the body being configured to move in a reeling direction, the body including a head and a tail that are spaced apart from each other in a longitudinal direction of the body;

a swinging part movably mounted in the body so as to be movable after the body changes from a moving state to a stopped state, the swinging part having a plate-like shape with a longitudinal dimension extending in the longitudinal direction of the body, a height dimension extending in a height direction of the body perpendicular to the longitudinal direction of the body, and a thickness dimension extending in a thickness direction of the body perpendicular to the longitudinal direction of the body and the height direction of the body, the thickness dimension being smaller than the longitudinal dimension and smaller than the height dimension; and a rod extending inside the upper portion of the cavity in the thickness direction of the body, the rod having a pair of opposite ends, each end of the rod being fixed to the body, the swinging part having a mounting hole that passes through the thickness dimension at an upper portion of the swinging body, the rod passing through the mounting hole of the swinging part, an internal diameter of the mounting hole being larger than an external diameter of the rod such that an upper portion of the mounting hole contacts an upper portion of the rod and a lower portion of the mounting hole is spaced apart from a lower portion of the rod with a gap existing between the lower portion of the mounting hole and the lower portion of the rod when the lure is in an upright orientation with the longitudinal direction of the body and the thickness direction of the body oriented substantially horizontally, the mounting hole and the rod being dimensioned such that the swinging part swings left and right along the rod in the thickness direction of the body as the body changes from the moving state to the stopped state, a first distance from the rod to an interior surface of the upper portion of the cavity in the height direction of the body is smaller than a second distance from the rod to a bottom edge of the swinging part in the height direction of the body in a stationary state of the lure in which the body and the swinging part are stationary, the swinging part being dimensioned such that a full rotation of the swinging part around the rod is inhibited.

2. The lure according to claim 1, wherein the swinging part being configured to emit light received from outside of the body, the body being configured such that the light emitted from the swinging part is visible to the outside of the body.

3. The lure according to claim 2, wherein the swinging part includes a reflector.

4. The lure according to claim 2, wherein the swinging part includes a fluorescent body.

5. The lure according to claim 1, wherein the swinging part is arranged to oscillate relative to the body after the body changes from the moving state to the stopped state.

6. The lure according to claim 1, wherein the cavity interior is depressurized relative to atmospheric pressure.

7. The lure according to claim 1, wherein the swinging part includes a plurality of swinging parts, the rod includes a plurality of rods, each of the plurality of rods passing through the mounting hole of one of the plurality of swinging parts, respectively, the plurality of swinging parts being arranged end-to-end along the longitudinal direction of the body such that a longitudinal spacing between longitudinal ends of adjacent pairs of the plurality of swinging parts is smaller than a longitudinal dimension of each of the plurality of swinging parts.

8. A lure comprising:

a body having a cavity, the body being configured to move in a reeling direction;

at least one coil spring; and a swinging part disposed within the cavity, the swinging part being movably attached by the at least one coil spring to the body so as to oscillate relative to the body after the body changes from a moving state to a stopped state, the swinging part having a plate shape and including a reflector, a longitudinal direction of the swinging part extending along a tension direction of the at least one coil spring, a first portion of the at least one coil spring extending in the longitudinal direction of the swinging part from a first longitudinal end of the swinging part to a first connection point on an interior surface of the cavity, a first distance between the first longitudinal end of the swinging part and the first connection point being smaller than a longitudinal length of the swinging part in a stationary state of the lure in which the body and the swinging part are stationary, a second portion of the at least one coil spring extending in the longitudinal direction of the swinging part from a second longitudinal end of the swinging part to a second connection point on the interior surface of the cavity, the second longitudinal end being opposite the first longitudinal end in the longitudinal direction of the swinging part, a second distance between the second longitudinal end of the swinging part and the second connection point being smaller than the longitudinal length of the swinging part in the stationary state of the lure, a sum of the first distance and the second distance being smaller than the longitudinal length of the swinging part, and the swinging part being located at least in the front and upper portion of the cavity.

9. The lure according to claim 8, wherein the body and the cavity are configured to surround the swinging part such that, in a side view, a shortest distance from any position on a periphery of the swinging part to the interior surface of the cavity is smaller than the longitudinal length of the swinging part.

* * * * *